June 18, 1963 J. CADIOU 3,094,077
HYDRAULIC GENERATORS AND MOTORS
Filed July 5, 1961 2 Sheets-Sheet 2

INVENTOR
JEAN CADIOU
By Wenderoth, Lind & Ponack
ATTORNEYS

United States Patent Office 3,094,077
Patented June 18, 1963

3,094,077
HYDRAULIC GENERATORS AND MOTORS
Jean Cadiou, Paris, France, assignor to Societe Anonyme Andre Citroen, Paris, France, a corporation of France
Filed July 5, 1961, Ser. No. 121,867
Claims priority, application France Sept. 3, 1960
5 Claims. (Cl. 103—161)

The construction of hydraulic generator and motor apparatus intended to operate under high pressures necessitates an arrangement of parts such that the pressure components balance each other in order to prevent deformation and passive resistances.

This condition assumes increasing importance as the power transmitted increases, and especially in the case of transmission of driving power, in which efficiency is a fundamental consideration.

An object of the present invention is the combination in a single unit of two motors or generators serving two circuits or two receiving members such as the wheels of a vehicle axle. A further object consists of various arrangements provided for balancing the stresses and the regulation of the cylinder capacity.

An apparatus of this kind can be utilized as a progressive and self-balancing transmission operating with a liquid under high pressure.

The invention will now be described by way of example with reference to the accompanying drawings, in which:

FIGS. 4 and 5 are diagrammatic front views of the two alternative forms of construction shown respectively on the right-hand and left-hand sides of FIG. 1.

Figure 1:
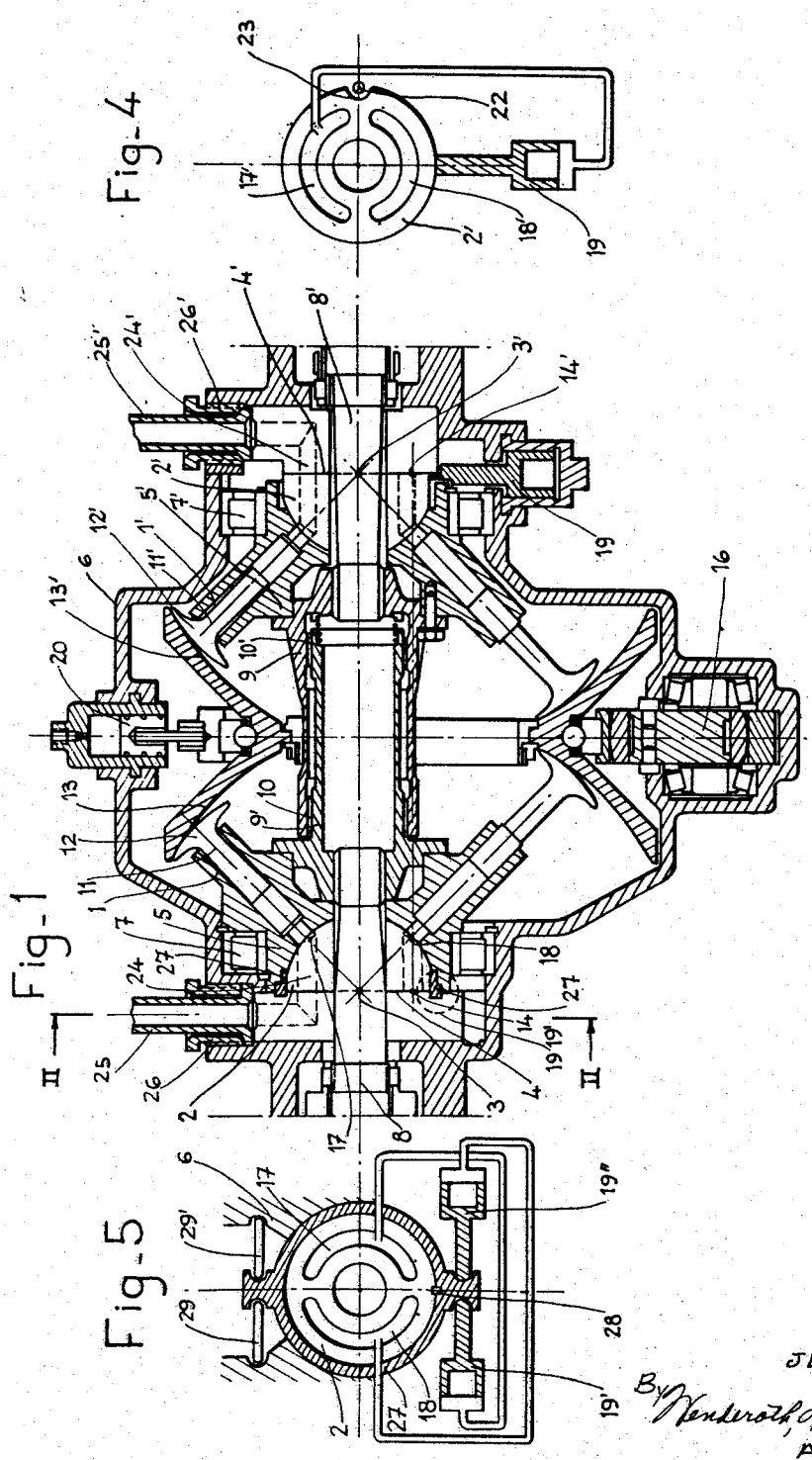
FIG. 1 is a longitudinal cross-section of the apparatus different balancing arrangements being shown on the right-hand and left-hand sides.

Referring to the drawings, it can be seen that the motor and generator unit comprises two symmetrical coaxial portions arranged in such manner as to balance the axial thrust stresses. In the text which follows, it will be assumed that a motor unit receives a fluid under pressure, but it must be clearly understood that the arrangement is identically the same when the unit acts as a pressure generator, the same apparatus being able to function as a motor or as a generator, at will.

In more detail, the apparatus comprises—in the interior of a casing 6 and arranged on two coaxial shafts 8 and 8' which are held in line with each other by sleeve 9 and 9' supported by bearings 10 and 10'—barrels 5 and 5' and hemispherical distributors 2 and 2', the spherical faces of which are directed towards the central plane of the apparatus.

Each barrel is fast for rotation with the corresponding shaft; it is bored with a series of cylinders 1 or 1' distributed along a cone having its apex at the centre 3 or 3' of the spherical face of the corresponding distributor. This latter is in contact by its spherical face with a corresponding spherical surface formed in the rear face of the barrel.

The rear surface of each distributor is a flat diametral surface 4 or 4' passing through the centre of the cone on which are distributed the cylinders 1 or 1'. This flat surface is supported by a corresponding flat surface of a member rigidly fixed to the casing. Each distributor is freely mounted axially, but is held against a movement of rotation by any appropriate means.

For example, as shown in FIG. 4, there may be placed in the casing 6 a lug 22 and the distributor will be provided with a recess 23 having a slight play with respect to the lug 22; another arrangement is shown in FIG. 5, in which the distributor is held with a slight play inside a ring 27, with respect to which it is prevented from rotating by means of a dog 23.

A balancing thrust is transmitted to the ring 27 by one of the pistons 19' or 19'', mounted in two cylinders, one of which receives the supply pressure and the other the exhaust pressure.

The position of the ring 27 is fixed on the other hand by means of rods 29 and 29' buttressed in recesses formed integrally with the casing 6. As will be explained later, this device is provided to give the least constraint possible to the position of the distributor and to balance the thrusts which are applied to it, irrespective of the direction of the hydraulic pressure.

The barrels 5 and 5' are held centered inside the casing by means of roller bearings 7 and 7' with a high load capacity, while the distributors are held in position by their spherical surfaces.

The pistons 11 and 11' of each series of cylinders each have a head provided with a spherical shoe 12 and 12', which come into contact with surfaces 13 and 13' which are also spherical, but in which the centres 14 and 14' are eccentric to a variable extent with respect to the line of axis of the barrels.

The two spherical surfaces 13 and 13' each constitute the reaction support of a series of pistons and are solid and assembled in opposition to each other. They are movable only along a pre-determined path, either translation between two slides, or rotation about a centre located in the central plane, or a more complicated movement, still in the same plane, depending on the law which it is sought to give to the variation of the pressures and volumes.

Figure 2:
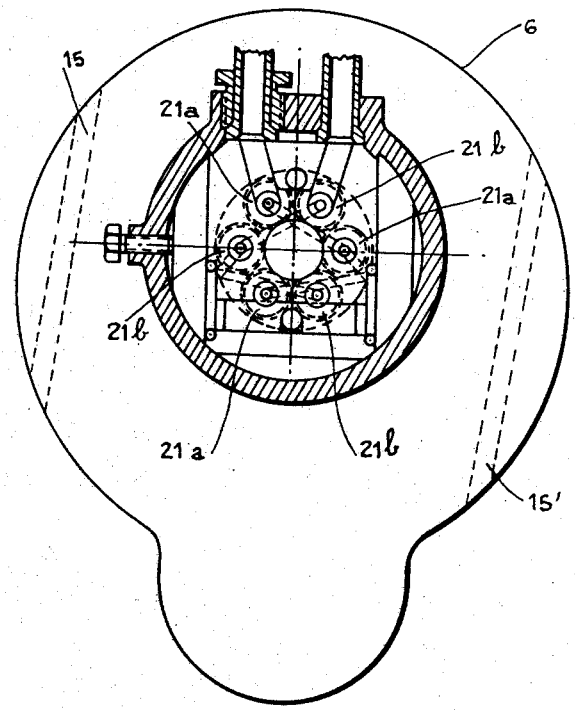
FIG. 2 is a transverse cross-section taken along the line II—II of FIG. 1.
Figure 3:
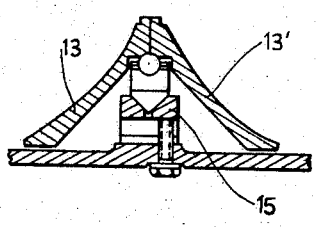
FIG. 3 is a detail view.

In the drawing of FIG. 2, there have been shown diagrammatically two slides 15 and 15', of which a more detailed section is given in FIG. 3, which permit the movement manually or automatically controlled by the eccentric 16. It can immediately be seen that for zero eccentricity, the travel of the pistons would be zero and that this travel increases with the eccentricity.

Each of the distributors supplies its group of cylinders through two circular orifices 17 and 18 or 17' and 18', one for the admission and the other for the return. These orifices are in communication through suitable conduits 24 and 24' with the incoming or outgoing fluid orifices 25 and 25' located in members 26 and 26' fixed to the casing.

The distributors are subjected to a lateral thrust equal to the resultant of the pressure forces on the adjacent barrel; this thrust is balanced in the arrangement of FIG. 4 by a piston 19 to which is applied the actual admission pressure.

As has been indicated previously, a device may be provided as shown in FIG. 5, which effects a double balancing so as to reverse the counter-thrust in the case where the pressure became reversed, for example in a moving vehicle when the driving force is reduced or cut-off, the wheels returning power to the apparatus which then functions as a pump.

In this case, there are provided two balancing pistons 19' and 19'' coupled respectively to the admission and the exhaust.

The torque thrust on the reaction surfaces may also be compensated by means of a piston 20, so as to facilitate the operation of the regulation control (FIG. 1).

In addition, the distributors are kept floating by means of a counter-pressure applied on their flat supporting faces, this counter-pressure being established by the introduction of the admission fluid to the cavities 21. These cavities should have a suitable surface, so as to balance the resultant thrust applied by the pistons at admission (FIG. 2).

It will be advantageous to arrange these cavities symmetrically, and to provide, as before, for the reversal of the pressures, by forming two groups of cavities, one 21a coupled to the admission and the other 21b coupled to the exhaust.

During the course of operation, the pistons subjected to the pressure of the fluid arriving through the ports 17 and 17' and supported on the spherical reaction surfaces, compel the barrels to rotate about their axes; it will be seen that the point of action of each piston is located at a variable point of its spherical head, and that it is driven in rotation on itself, in one direction during a certain travel and then in opposite direction during the return movement.

The speed of operation is regulated, as has already been explained, by the eccentricity of the axes of the surfaces 13 with respect to the axes of the barrels; in fact this eccentricity determines the cylinder capacity developed at each revolution of the barrels.

The orientation of this eccentricity with respect to the plane of symmetry of the admission and exhaust openings 17 and 18 is arranged so as to provide suitable changeover intervals; this orientation varies naturally according to the pressure and the cylinder capacity, and an adjustment may be provided, either automatic or controlled.

I claim:

1. A hydrodynamic machine operating as a generator or a receiver of hydraulic pressure comprising a casing, two coaxial spaced shafts mounted in said casing, a barrel fixed to each shaft, inclined spaced cylinders provided in each barrel, the projected axes of the cylinders of each barrel intersecting, a central element having two spherical surfaces located between said barrels, pistons in each of said cylinders cooperating with said surfaces, means for eccentrically adjusting said central element with relation to the common axis of said shafts, floating distributors for feeding said cylinders, said distributors and said barrels having cooperating spherical contact surfaces, the center of said spherical surfaces coinciding with the projected focus of the axes of said cylinders, said distributors comprising means for equalizing the pressure with respect to an axial thrust and a lateral thrust.

2. A hydrodynamic machine as set forth in claim 1 wherein said means for equalizing the pressure comprises pressure-balancing means to modify the effects of hydraulic thrusts, and eventually to render said distributors floating.

3. A hydrodynamic machine as set forth in claim 1 wherein said spherical distributors comprise a flat diametral surface intended to make contact with a supporting surface fixed to the casing of the device.

4. A hydrodynamic machine as set forth in claim 3, wherein the axes of said cylinders of each respective barrel converge towards a centre located on said supporting surface of the distributor which cooperates with each respective barrel.

5. A hydrodynamic machine as set forth in claim 1 wherein said means for eccentrically adjusting said central element comprising guiding means determining for said central element a predetermined course so that the intervals between changing-over can be adjusted so that smooth operation without any abrupt variation of pressure may be obtained.

References Cited in the file of this patent

UNITED STATES PATENTS

| | | |
|---|---|---|
| 2,245,570 | Centervall | June 17, 1941 |
| 2,608,933 | Ferris | Sept. 2, 1952 |
| 2,747,515 | Montelius | May 29, 1956 |
| 2,871,797 | Bourassa et al. | Feb. 2, 1959 |

FOREIGN PATENTS

| | | |
|---|---|---|
| 141,393 | Great Britain | Apr. 12, 1920 |
| 163,353 | Austria | Nov. 15, 1948 |